Patented Jan. 9, 1951

2,537,014

UNITED STATES PATENT OFFICE 2,537,014

PROCESS OF MAKING MAGNESIA

Leslie W. Austin, San Jose, Calif., assignor to Kaiser Aluminum & Chemical Corporation, a corporation of Delaware No Drawing. Application January 21, 1948, Serial No. 3,555

8 Claims. (Cl. 23—201)

1

This invention relates to a well-crystallized periclase and to a method of making the same, and it relates particularly to the method of making well-crystallized periclase wherein small amounts of silica are added. This application is a continuation-in-part of my co-pending application, Serial Number 507,044, filed October 20, 1943, now abandoned.

It is an object of this invention to provide thoroughly shrunk magnesia refractory material. It is a further object to provide periclase containing a higher percentage of magnesium oxide than is obtainable by processing the current grades of natural ores. Another principal object of this invention is to provide periclase of superior properties; and a further object is to enable formation or burning of the grains at temperatures which are lower and more economic than those previously required for material of the same chemical composition.

It is a problem, in sintering cryptocrystalline or microcrystalline magnesia material, to effect shrinkage, decrease in porosity and increase in density. When natural magnesites have been fired to form magnesia refractory grain material, ores have been preferred which contain considerable amounts of impurities which promote sintering, such as iron oxide, calcium oxide and the like; and the more pure natural materials, such as Grecian magnesite, for instance, have been considered inferior because they do not sinter well at firing temperatures which are ordinarily obtainable or commercially practicable. In other words, in order to secure complete shrinkage of the magnesia it has been the practice generally to have present considerable amounts of fluxing impurities, such as iron oxide, lime, alumina, silica or combinations of these, and the effect has been, in this case, to lower the refractoriness of the final product. The alternative, in order to maintain high refractoriness, has been to dispense with these additions but to fire at uneconomically high temperatures. Other methods have been proposed to reduce shrinkage and decrease porosity. Thus it has been proposed to mill the magnesia starting material. It has also been proposed to admix magnesia and 2% to 5% of silica, grind the mixture very finely, fire, grind the fired material, form into shapes and again fire, requiring two firing steps. These proposed methods still require either very high firing temperatures or successive firings.

According to the present invention it has been found that a dense magnesia refractory grain material is obtained by admixing and thoroughly interdispersing very finely divided magnesia-yielding material and a minor proportion of silica having a specific surface of not less than about 6000 square centimeters per gram, and firing the mix. In this manner there is effected the development of comparatively large and closely packed crystals of periclase. Shrinkage during later use is so small as to be negligible, because in this method of making the grain crystal growth is brought to substantial equilibrium in the firing step.

The magnesia material which is useful as a starting ingredient of the mix is precipitated magnesia-yielding material, such as precipitated magnesium hydroxide, or precipitated magnesium carbonate, for example. These precipitated substances are finely divided, are especially suitable for intermixture with the fine silica and are obtainable in a particularly pure state. Especially good results are obtained when starting with magnesium hydroxide obtained by treating sea-water or similar dilute brine with dry calcined dolomite and washing the precipitate with fresh water. When working with a precipitated magnesium carbonate which has a very fine particle size it is advantageous to compact or press the carbonate-silica mixture prior to firing.

The magnesia-yielding material is of a purity to provide not over about 2.0% CaO, not over about 2.0% $Fe_2O_3$, not over about 1.0% $Al_2O_3$ and not over about 2.0% $SiO_2$. It is preferred that the magnesium oxide content, however, should be at least 95.0% on the ignited basis, and in this way the values of the impurities will be less than the limits shown.

The silica which is useful in this invention is of fine particle size, exhibiting a specific surface of at least 6000 square centimeters per gram. An especially advantageous starting material is silica which has been obtained by deposition from the vapor phase and has a specific surface of about 67,000 square centimeters per gram.

Silicas which have been found to exert a favorable action on the crystallization of high-purity and finely divided magnesia include, for example, diatomite which is of high purity and especially which is low in lime and alumina, a silica powder recovered by a dust-collecting system from a quartz-grinding process, and silica recovered as a finely divided powder by deposition from the vapor state as, for instance, in the ferrosilicon process.

A silica which is especially useful in this process is that recovered as a finely divided powder deposited from the gases issuing from a zone wherein ferrosilicon is being made by reduction of siliceous material, such as quartz, tridymite, etc. with carbon in the presence of iron. Such silica is amorphous and consists of spherical particles of the following typical size distributions:

*Table I*

| Particle Size in Microns | Per Cent by Weight Finer than Limiting Diameters |
|---|---|
| 44.0 | 99.1 |
| 33.5 | 98.4 |
| 19.0 | 93.8 |
| 12.5 | 86.3 |
| 10.0 | 82.4 |
| 7.5 | 77.5 |
| 5.0 | 74.2 |
| 4.0 | 70.6 |
| 1.0 | 67.2 |

The specific surface of this silica fume has been found to be about 67,500 square centimeters per gram. It contains approximately 95% to 97.5% of silicon dioxide.

Another silica of special utility in this process is that recovered in a process wherein silica is reduced with carbon or other reducing agent at a temperature sufficiently high to give vaporous products of reduction, and the vaporous products issuing from the reduction zone are then oxidized while in the vapor state. A finely divided silica powder is recovered which is amorphous and of size comparable to the fume from the ferrosilicon process. All of the silicas useful in this invention are of high purity and contain preferably at least 95% of $SiO_2$.

A minor proportion of the silica is admixed with the magnesia, and it is preferred to add from about 1.0% to 5.0% of silica, based on the total weight of the fired mix. The silica and magnesia-yielding material are thoroughly interdispersed. It is essential, in order that the silica can exert its effect upon the crystallization of the magnesia, that the silica be in the fine state of subdivision described and that it be thoroughly dispersed through the precipitated magnesium compound at the time that firing is begun. It may be that the silica exerts a catalytic effect upon the magnesia crystallization, inasmuch as such small quantities are effective. It is to be noted that the very pure Grecian magnesites, which may contain as much as 2.6% or even more of silica, have been recognized as unsatisfactory for firing to grain without the addition of fluxing, or sintering, agents, because otherwise uneconomically high firing temperatures are required. It is believed that this is because the silica in such magnesites occurs in fairly large masses or clumps in the ore, but is not uniformly dispersed therethrough in the manner found effective in the method of the present invention.

The interdispersion, according to this invention, can be effected in a number of ways. It is especially advantageous however to add the silica to the magnesium compound while the latter is in the form of a slurry with water. Another advantageous process of mixing is to add the silica to a solution of magnesium salt, and then to precipitate the magnesium compound starting material from the solution.

The silica can be mixed, for example, with magnesium hydroxide which has been precipitated from seawater or brines by addition of lime or calcium hydroxide. A preferred embodiment of this invention is to mix the silica with magnesium hydroxide obtained by precipitating the hydroxide from seawater, or similar dilute brine, by addition thereto of dry calcined dolomite, and washing the precipitate with fresh water; to dewater and to fire, preferably in a rotary kiln at a temperature of about 1700° C. Alternatively, the silica can be added to the seawater or brine prior to treatment with the calcined dolomite. When the silica is added to the precipitated hydroxide it can be mixed therewith while the hydroxide is in the slurry form and the slurry can then be fired directly, but preferably the slurry mixture is filtered and the filter cake which is recovered is then fired. Instead of adding the silica to magnesium hydroxide, it can be added to precipitated magnesium carbonate in slurry, or to a solution from which magnesium carbonate is precipitated. The precipitation of the carbonate is effected by methods known to the art. When a finely divided precipitate of magnesium carbonate is the starting material, it is especially advantageous, however, to admix the carbonate-water slurry and silica, to filter and/or to dry and to compress the dry admixture, as by briquetting, for instance, prior to firing, in order to obtain the most complete shrinkage in the single firing step.

In order to demonstrate the improvement in porosity obtainable by the method of the invention, tests have been carried out as given in Table II which show the porosities of magnesia grain material made with the silica of the prior art as contrasted with porosities of such grain made according to one embodiment of the present invention. The magnesia-yielding starting material is magnesium hydroxide obtained in the process wherein seawater is treated with dry calcined dolomite, and the resulting hydroxide precipitate is washed and filtered. To the filter cake thus obtained is added about an equal weight of water, and silica is mixed with uniform portions thereof in the percentages by weight and of the kinds shown in the table. The hydroxide slurry and silica are mixed in a turbine-type mixer. The magnesium hydroxide-silica mixture is dried in pans to form cakes and the cakes are fired at the indicated temperatures for one-half hour, without further treatment or pressing. These porosities are representative of some of the advantages of this invention, because low porosity is a measure of degree of crystallization. That is, a well-crystallized periclase has a low porosity.

Table II

| | Total SiO$_2$ including that in MgO | Specific Surface SiO$_2$, sq. cm./gm. | Porosity in Percent by Volume when fired at— | | |
|---|---|---|---|---|---|
| | | | 1500° C. | 1600° C. | 1700° C. |
| 1% SiO$_2$ added as: | | | | | |
| Silica fume (ferrosilicon) | 2.3 | 67,500 | 11.1 | 8.8 | 7.0 |
| Diatomite | 2.3 | 13,000 | 12.0 | 8.3 | 8.2 |
| Dust from quartz grinding | 2.3 | 7,400 | 12.5 | 9.7 | 7.3 |
| Ground Crystalline silica passing 200 mesh | 2.3 | 2,800 | 16.9 | 10.3 | 11.7 |
| 3% SiO$_2$ added as: | | | | | |
| Silica fume (ferrosilicon) | 4.3 | 67,500 | 8.9 | 5.0 | 5.0 |
| Diatomite | 4.3 | 13,000 | 9.8 | 6.2 | 5.8 |
| Dust from quartz grinding | 4.3 | 7,400 | 11.0 | 5.9 | 5.6 |
| Ground Crystalline silica passing 200 mesh | 4.3 | 2,800 | 13.9 | 8.9 | 11.2 |
| 5% SiO$_2$ added as: | | | | | |
| Silica fume (ferrosilicon) | 6.3 | 67,500 | 6.0 | 5.1 | 4.4 |
| Diatomite | 6.3 | 13,000 | 6.6 | 6.6 | 5.7 |
| Dust from quartz grinding | 6.3 | 7,400 | 7.5 | 6.9 | 6.0 |
| Ground crystalline silica passing 200 mesh | 6.3 | 2,800 | 14.4 | 10.7 | 11.2 |

In this table, the silica fume is that recovered in the ferrosilicon manufacture and has the characteristics hereinbefore described in greater detail. The diatomite is a natural mineral containing about 0.29% of lime, and 2.8% alumina. The silica from quartz grinding is that collected by a dust collector from a quartz-grinding system, and the silica passing 200 mesh is a ground silica sand. All of these silicas analyze over 95% SiO$_2$ on the ignited basis. The magnesium hydroxide in the above tests has the following analysis, on the ignited basis: 1.05% silica, 1.20% CaO, 0.17% Al$_2$O$_3$, 0.30 Fe$_2$O$_3$ and magnesium oxide by difference) 97.3%.

It will be noted that not only are the porosities higher in the case of minus 200 mesh silica, but that they increase upon firing above 1600° C. This silica does not catalyze the crystallization of magnesia from precipitated magnesium hydroxide in the manner of the more finely divided silicas. It is possible that the minus 200 mesh silica forms magnesium metasilicate or similar matrix, liquid at the higher firing temperatures, which closes off the pores of the refractory material and results in trapping gases therein, which expand upon heating to cause an increase in the pore size and a decrease in the apparent specific gravity. This increase in porosity is avoided by employing silicas having a specific surface of at least about 6000 square centimeters per gram, whatever may be the mechanism of the changes occurring during firing.

In preparing well-shrunken and well-crystallized periclase from precipitated magnesium carbonate, the carbonate silica mixture is preferably compacted prior to firing. As an example, the magnesium carbonate in slurry with water is divided into several portions, each of the same composition. One of these (A) is dried, pulverized and pelleted under a pressure of about 2000 lbs. per square inch, and the pellets are fired at 1600° C. for one-half hour. To another portion of the slurry is added 1% by weight of silica recovered from the ferrosilicon process as described above, and to another portion (B—B), 1% by weight of silica sand ground to pass 200 mesh. To still another portion (C) is added 3% by weight of the ferrosilicon silica and to another portion (C—C), 3% by weight of the sand ground to pass 200 mesh. Each silica-containing portion is thoroughly mixed, and is then pelleted and fired in exactly the same manner as portion A. The silica is added, in this example also, in percent by weight based on the weight of the fired product.

The resulting porosities are as follows:

Table III

| | Percent by volume |
|---|---|
| A | 7.7 |
| B | 5.6 |
| B—B | 9.4 |
| C | 2.5 |
| C—C | 8.7 |

In contrast to the low porosities obtained as shown above, using precipitated magnesia-yielding compounds as starting materials, much higher porosities are obtained in grain materials prepared by firing mixtures of the silica of this invention with natural magnesite of high purity, or with magnesia obtained by the calcination of precipitated magnesium hydroxide or of other high-purity material. For instance, when admixing natural magnesite of high-purity and 3% by weight of silica from the ferrosilicon process, the porosity of the resulting grain fired at 1600° C. is about 17%; and when magnesia obtained by calcining precipitated magnesium hydroxide from the seawater process is admixed with 3% of the silica from the ferrosilicon process, the porosity of the resulting grain fired at 1600° C. is about 23%. Furthermore, the strengths of the grains obtained by firing mixtures of the silica of this invention and the precipitated magnesium compounds are superior to the strength of grains made in a similar manner but starting with magnesia itself or with high-purity natural magnesite. Improvements of about 37% have been obtained in the porosity of grain made from precipitated magnesium carbonate without compacting the mix prior to firing, but it has been found that in order to get a tough grain having a porosity below 10% it is necessary to compact the mix before firing, as shown above.

The magnesia grain material obtained as shown above, with the silicas of at least 6000 sq. cm. per gm. specific surface, is hard and quite tough, and when formed into bricks or other shaped products exhibits good hot-load strengths. Material of the porosities shown is obtained upon a single firing of the magnesia mixed with the silica described. The product is substantially in equilibrium with regard to state of crystallization and it will not exhibit much change by further heating.

It is an advantage of this invention that the macrocrystallization, or formation of large crystals, of magnesia or periclase from precipitated magnesium compounds is accelerated. It is a particular advantage also that this macrocrystallization is effected at the temperatures ordinarily obtainable in the rotary kiln, and during fairly short heating periods. For instance, crystallization, to substantially complete equilibrium, is effected by firing at from about 1600° C. to about 1800° C., and for a period of from twenty to forty minutes.

As has been set forth above, it has previously been known to fire high-purity magnesites at very high temperatures to effect crystallization and proper shrinkage or, alternatively, to add to such magnesites fluxing impurities, particularly iron oxide, lime, alumina, silica and mixtures of these, in amounts which reduce the refractoriness of the grain, to enable burning at commercially practicable temperatures and times of firing.

It is a principal advantage of this invention that high-purity magnesia grain can be brought to substantial crystallization equilibrium by uniformly mixing with high-purity magnesia-yielding starting material silica of the particle size described, and then firing at commercially practicable temperatures. In fact, the mix can be fired in the rotary kiln. It is a further advantage that the refractoriness of the grain is not impaired because silica alone is added, in small amounts and in uniform dispersion. The grain provided by this invention has a softening or sintering temperature averaging about 200° C. higher than that of the known deadburned magnesites.

It is believed that the improved results can be best explained by considering the matrix which encloses or coats the periclase crystals and binds them together, to be a five-component system, consisting essentially of the constituents

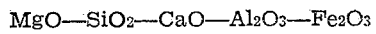

$$MgO\text{---}SiO_2\text{---}CaO\text{---}Al_2O_3\text{---}Fe_2O_3$$

Most of the magnesia in the grain exists as periclase crystals and a large proportion of the $Fe_2O_3$ is in solid solution in these crystals, but some of these constituents also go into the matrix. As soon as this matrix or a substantial proportion of it melts it becomes a lubricant and the grain then deforms rather easily under load. In the case of the five-component system, a number of minerals can be formed at various temperatures, including monticellite, forsterite, anorthite and possibly wollastonite and diopside. Upon rapid cooling of the molten matrix quantities of glass are also found. The melting points of all of these compounds are below that of periclase, and the melting point of eutectics between these minerals may be as low as 1165° C. The existence or development of these minerals is the cause of the failure of magnesite bricks ordinarily at temperatures varying from 1435° C. to 1530° C., and averaging around 1477° C.

High-purity magnesia from magnesium hydroxide obtained from seawater or brines is very refractory and has a high failure temperature because the minerals described above exist in very small amounts. However, temperatures of as high as 1870° C. are required in the kiln in order to produce usable grain from magnesia material of this purity. Such temperatures are difficult and costly to attain and can be reached in a fuel-fired furnace only with special equipment. Whereas magnesite grain made from an ore containing 82.5% MgO, 6.9% $SiO_2$, 5.2% CaO, 1.4% $Al_2O_3$ and 4.0% $Fe_2O_3$, for example, will contain about 25% liquid (matrix) at 1650° C. and 23% liquids at 1505° C., fired magnesia of high purity as obtained from seawater and brines contains only about 8% liquids at 1870° C. and 6% liquids at 1670° C. It is advantageous, therefore, to make grain of such high purity magnesia and it is a particular advantage of this invention that this high purity magnesia-yielding material can be fired economically and readily to a dense, well-crystallized grain by admixing therewith silica as described and in such small amounts that the matrix system is maintained at a high melting point and the refractoriness of the grain is not significantly impaired.

In this specification and the claims, the term "magnesia-yielding" compound or substance is intended to mean a compound which will yield magnesia under the conditions of firing. The porosities as given herein are determined by the mercury displacement process. All percentages of compositions are percentages by weight, based on the total weight of the fired product, unless otherwise noted, except that porosities are expressed in percent by volume. While certain suitable magnesium-bearing solutions have been disclosed above, it is to be understood that the magnesia-yielding starting material can be precipitated from any magnesium-bearing solution. The silica can be mixed with the precipitate in slurry, or it can be mixed with the solution prior to precipitation of the magnesium compound.

Having now described the invention, what is claimed is:

1. Process of making magnesia which comprises admixing silica having a specific surface of at least 6000 square centimeters per gram and a magnesium salt solution, precipitating magnesium hydroxide from said solution, filtering, and firing the filter cake to form periclase, said silica being added in an amount to provide from 1% to 5% by weight of silica based on the weight of the fired product.

2. Process of making dense crystalline magnesia which comprises admixing a slurry of magnesium hydroxide, obtained by treating seawater with dry, calcined dolomite and washing the precipitated magnesium hydroxide with fresh water, and finely divided amorphous silica consisting predominantly of spherical particles less than one micron in diameter, filtering to obtain a filter cake consisting of said magnesium hydroxide intimately admixed with said silica, and firing to form periclase, said silica being added in an amount to provide from 1% to 5% by weight thereof based upon the weight of the fired product.

3. Process of making dense, crystalline magnesia which comprises admixing a slurry of magnesium hydroxide, obtained by treating seawater with dry, calcined dolomite and washing the precipitated magnesium hydroxide with fresh water, and finely divided amorphous silica consisting predominantly of spherical particles less than one micron in diameter, filtering to obtain a filter cake consisting of said magnesium hydroxide intimately mixed with said silica, and firing said filter cake in a rotary kiln, said silica being added in an amount to provide from 1% to 5% by weight thereof based on the weight of the fired product.

4. Process of preparing dense, crystalline magnesia which comprises uniformly admixing in a slurry of a precipitated magnesium compound adapted to yield magnesia upon firing 1% to 5% by weight, based on the total weight of the fired mixture, of silica having a specific surface of at least about 6000 square centimeters per gram, and firing said admixture to form periclase.

5. Process as in claim 4 wherein the silica is that recovered as a finely divided, amorphous powder deposited from the vapors issuing from a zone wherein ferrosilicon is being made by reaction of carbon and silica in the presence of iron.

6. Process as in claim 4 wherein the silica is diatomite.

7. Process of making dense, crystalline magnesia which comprises uniformly admixing a slurry of precipitated magnesium carbonate and from 1% to 5% by weight, based on the weight of the fired product, of silica having a specific surface of at least about 6000 square centimeters per gram, filtering to obtain a filter cake of said magnesium carbonate intimately admixed with said silica, compacting said admixture under pressure, and firing said compacted admixture to form periclase.

8. Process of making dense, crystalline magnesia which comprises uniformly admixing a slurry of precipitated magnesium carbonate and from 1% to 5% by weight, based on the weight of the fired product, of silica having a specific surface of about 67,500 square centimeters per gram, filtering to obtain a filter cake of said magnesium carbonate intimately admixed with said silica, pressing said admixture, and firing said pressed admixture to form periclase.

LESLIE W. AUSTIN.

REFERENCES CITED

The following references are of record in the file of this patent:

UNITED STATES PATENTS

| Number | Name | Date |
|---|---|---|
| 2,095,982 | Heany | Oct. 19, 1937 |
| 2,428,178 | Reik | Sept. 30, 1947 |